United States Patent [19]
Himuro

[11] Patent Number: 5,885,384
[45] Date of Patent: Mar. 23, 1999

[54] PNEUMATIC TIRE INCLUDING MAIN SLANT GROOVES AND AUXILIARY GROOVES

[75] Inventor: Yasuo Himuro, Tachikawa, Japan

[73] Assignee: Bridgestone Corporation, Tokyo, Japan

[21] Appl. No.: 871,583

[22] Filed: Jun. 9, 1997

[30]    Foreign Application Priority Data

Jun. 11, 1996   [JP]   Japan ..................................... 8-149177

[51] Int. Cl.⁶ .......................... B60C 11/03; B60C 115/00
[52] U.S. Cl. ................................. 152/209 R; 152/209 D
[58] Field of Search ............................ 152/209 R, 209 D

[56]            References Cited
            U.S. PATENT DOCUMENTS

| | | | |
|---|---|---|---|
| D. 370,440 | 6/1996 | Kuwazima et al. ................... | D12/147 |
| 4,962,801 | 10/1990 | Tsuda ................................... | 152/209 R |
| 5,105,864 | 4/1992 | Watanabe et al. ................... | 152/209 R |
| 5,291,929 | 3/1994 | Daisho et al. ........................ | 152/209 R |

FOREIGN PATENT DOCUMENTS

| | | |
|---|---|---|
| 0 565 270 A1 | 10/1993 | European Pat. Off. . |
| 0 688 685 A2 | 12/1995 | European Pat. Off. . |
| 0 705 718 A2 | 4/1996 | European Pat. Off. . |

OTHER PUBLICATIONS

*Patent Abstracts of Japan*, vol. 16, No. 384 (M–1296) Aug. 17,1992 (JP 04–126612).
*Patent Abstracts of Japan*, vol. 95, No. 11, Dec. 26, 1995 (JP 07–215013).
European Search Report dated Oct. 1, 1997.

*Primary Examiner*—Steven D. Maki
*Attorney, Agent, or Firm*—Sughrue, Mion, Zinn, Macpeak & Seas, PLLC

[57]            ABSTRACT

A pneumatic tire having excellent wet performance and steering stability and noise reduction comprises a tread divided into two regions by a pattern center, at least one of which regions is provided with a plurality of main slant grooves each being comprised of a steep slope segment and a gentle slope segment. Furthermore, when such a region is equally divided by a phantom line parallel with the pattern center into a tread central zone and a tread side zone, a steeply slant auxiliary groove communicating two adjoining main slant grooves with each other and a gently slant auxiliary groove arranged between the adjoining two main slant grooves are arranged in the tread side zone.

12 Claims, 4 Drawing Sheets

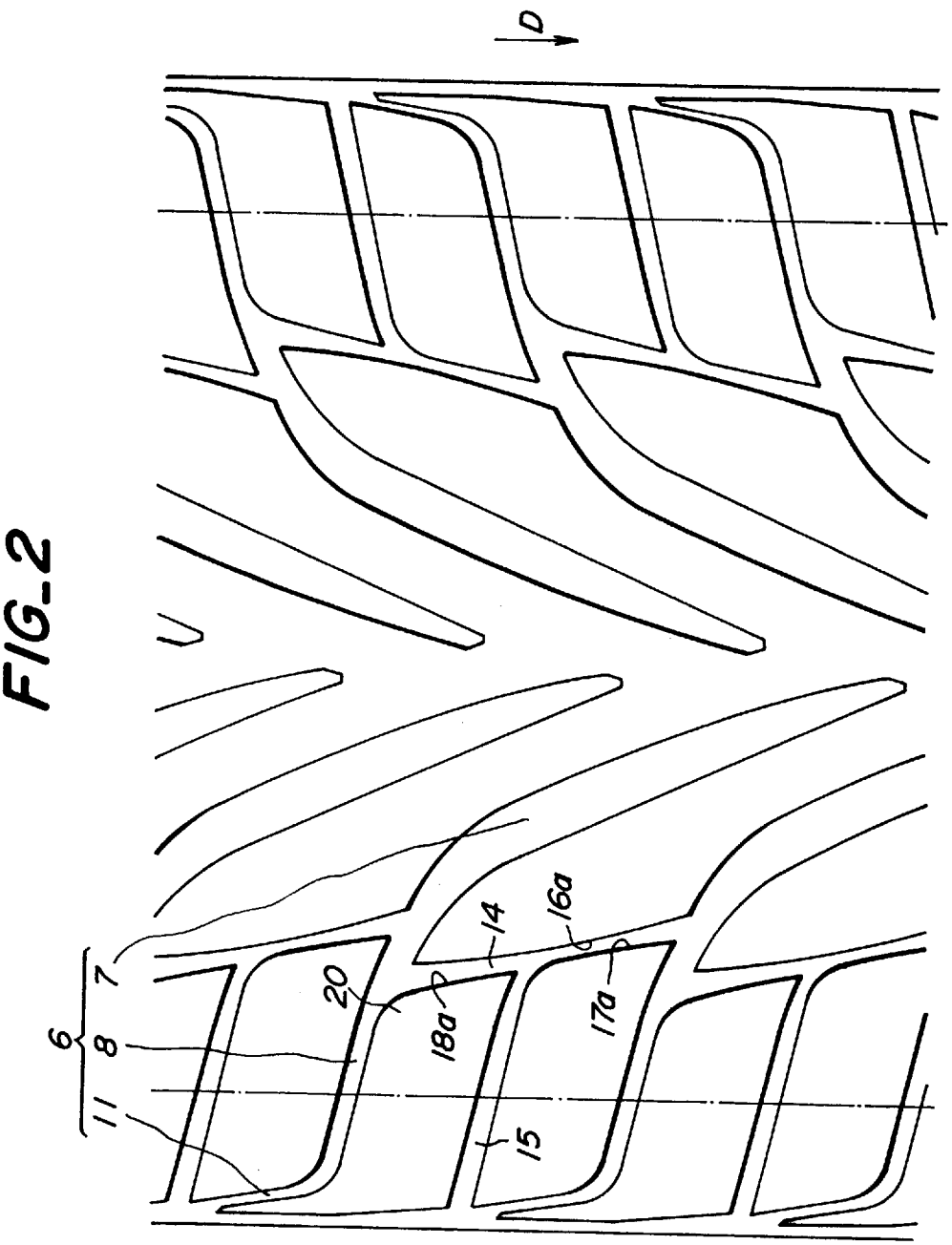

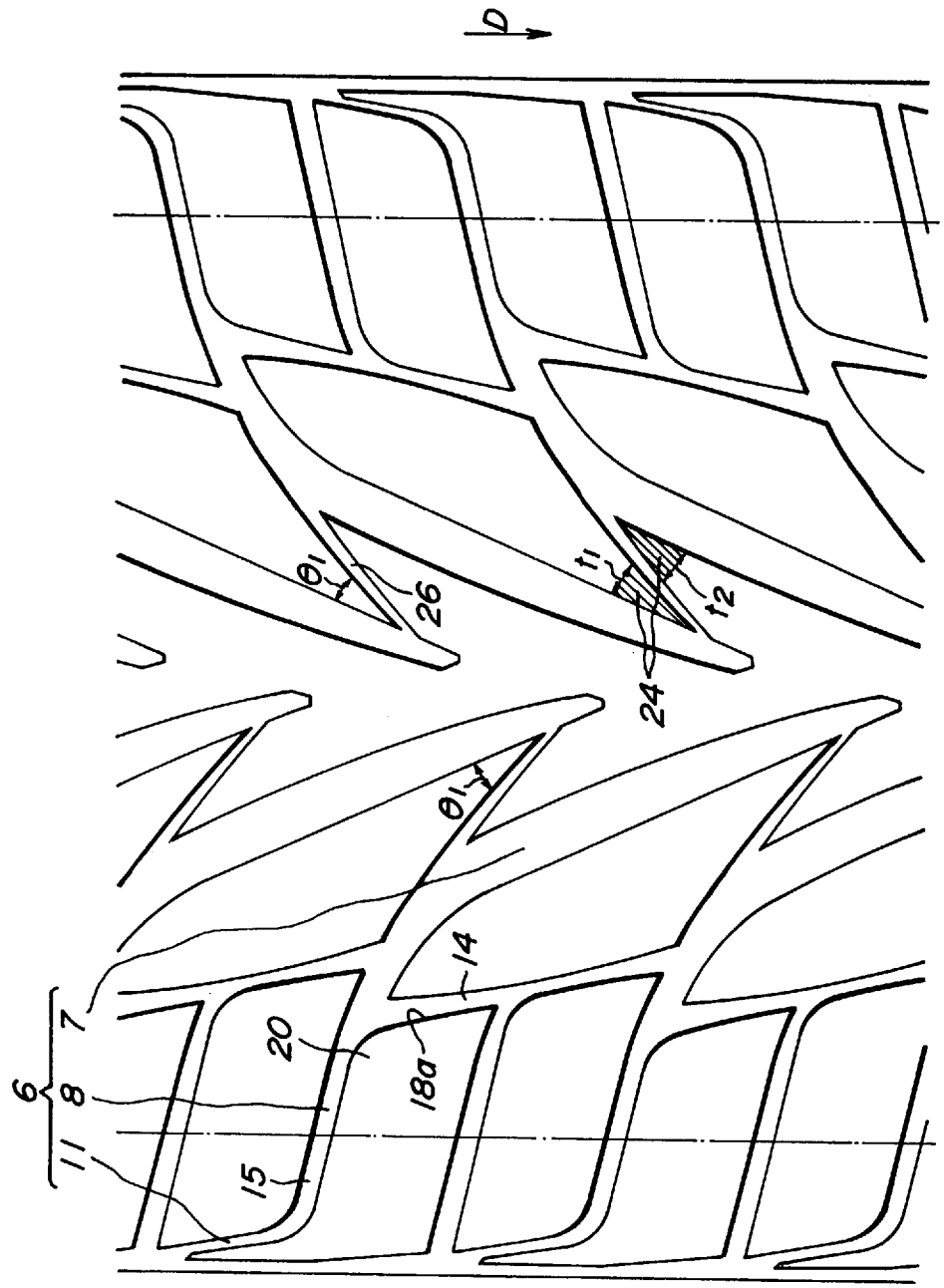
FIG._3

FIG_4
PRIOR ART
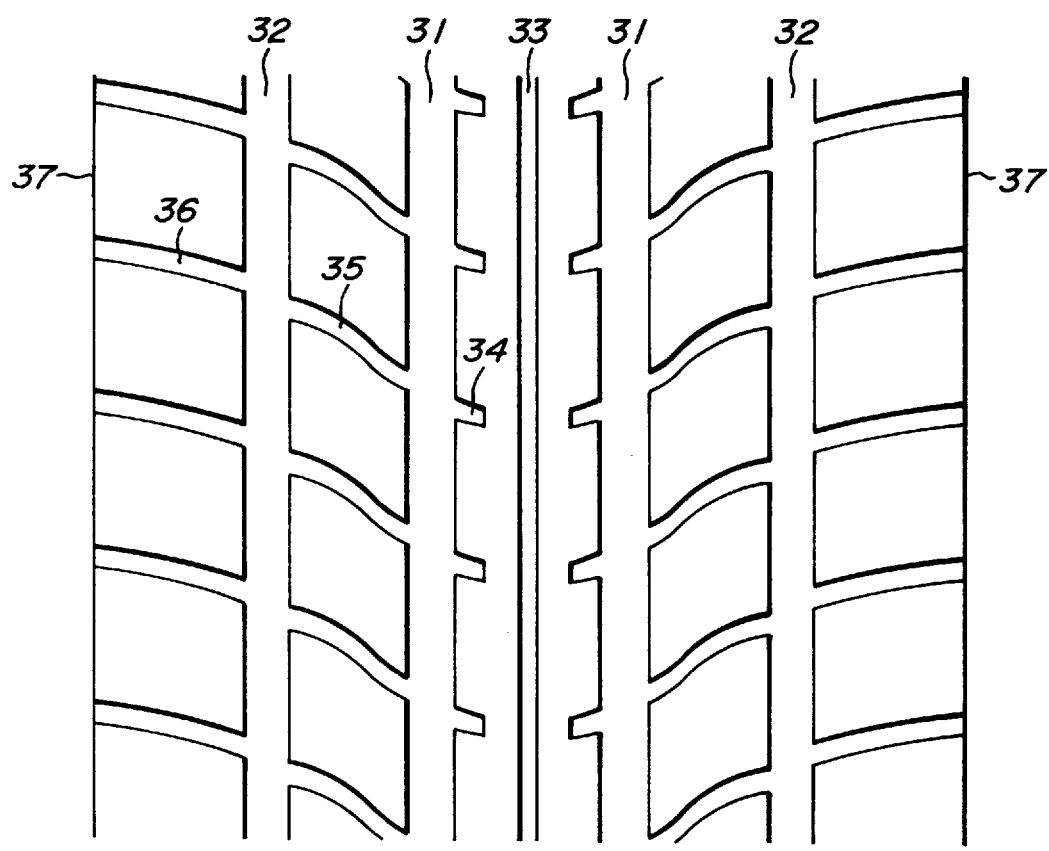

PNEUMATIC TIRE INCLUDING MAIN SLANT GROOVES AND AUXILIARY GROOVES

BACKGROUND OF THE INVENTION

1. Field of the Invention

This invention relates to pneumatic tires, and more particularly to a so-called high-performance pneumatic tire realizing improvements of wet performance and steering stability and reduction of noise without sacrificing other tire performances.

2. Description of Related Art

In order to simultaneously satisfy high wet performance and low noise, it is generally useful to adopt a so-called directional tread pattern defined by arranging in a tread portion circumferential grooves extending straight in a circumferential direction of the tire and a plurality of slant grooves extending obliquely in a direction of converging from each of ground contact ends of the tread toward a pattern center.

In order to further improve the wet performance, it is effective to render the slant groove into a steeply slant groove having a small inclination angle with respect to the circumferential direction of the tire. In this case, however, land portions defined by these steeply slant grooves have necessarily an acute portion, and hence the rigidity of the land portion lowers and steering stability is degraded.

In addition, it is effective to increase a negative ratio for improving the resistance to hydroplaning. However, the increase of the negative ratio undesirably increases the noise level.

In order to improve the steering stability, it is useful that the slant groove is a gently slant groove extending obliquely at a large inclination angle with respect to the circumferential direction of the tire, or the arranging pitch of the slant groove is made large to enlarge the land portion defined by these slant grooves. In this case, however, the gently slant groove causes the degradation of pattern noise and hence the sufficient drainage performance at the ground contact region of the tread, particularly central region thereof is not obtained.

In the conventional tire having the aforementioned tread pattern, it is difficult to simultaneously and balancedly establish the wet performance, steering stability and noise.

SUMMARY OF THE INVENTION

The inventor has made various studies in order to balancedly establish the wet performance, steering stability and noise considering the above features and obtained the following knowledge.

That is, it has been found out that the three performances may balancedly be satisfied by using as a basic construction such a tread pattern that each of the slant grooves is comprised of a steeply slant groove segment having a small inclination angle with respect to the circumferentail direction of the tire at a central region of the tread and a gently slant groove segment having a large inclination angle at each side region of the tread and the slant grooves are arranged at substantially equal intervals on the circumference of the tire, preferably so-called directional pattern of extending the slant grooves from each ground contact end of the tread in a direction of converging toward a pattern center and further arranging auxiliary grooves in each side region of the tread to rationalize the shape of the land portion located in the side region of the tread.

It is, therefore, an object of the invention to provide a pneumatic tire, particularly a high-performance pneumatic tire satisfying the improvement of wet performance and steering stability and the reduction of noise without sacrificing the other tire performances by rationalizing the arranging shape of the slant groove, newly arranging auxiliary grooves in the side region of the tread and rationalizing the shape of land portion located at the side region of the tread.

According to the invention, there is the provision of a pneumatic tire comprising a tread portion divided into two regions at a center of a tread pattern, and a plurality of main slant grooves arranged in at least one of the two regions at substantially equal intervals in a circumferential direction of the tire, each of which main slant grooves being comprised of a steep slope segment extending from a position of the pattern center or the vicinity thereof toward a side of a pattern end at a relatively small inclination angle with respect to a plane inclusive of the circumference of the tire and a gentle slope segment extending from the steep slope segment at a relatively large inclination angle with respect to the plane to the pattern end or to open at a ground contact end of the tread, and a plurality of land portions defined by adjoining two main slant grooves in said at least one of the two regions, the improvement wherein a steeply slant auxiliary groove communicating to the adjoining two main slant grooves and extending at a relatively small inclination angle with respect to the plane in the same direction as in the main slant groove and a gently slant auxiliary groove disposed between the adjoining two main slant grooves and extending from the steeply slant auxiliary groove to the pattern end or to open at the ground contact end of the tread substantially in parallel to the main slant groove are arranged in a tread side zone when said at least one of the two regions is equally divided by a phantom line parallel with the pattern center into a tread central zone and a tread side zone, and the land portion is further divided by the arrangement of these auxiliary grooves into a central land part and several shoulder land parts.

In a preferable embodiment of the invention, the construction formed in said at least one of the two regions of the tread is applied to the other remaining region and the main slant grooves located at both the two regions are arranged in a direction converging from the side of the ground contact end of the tread toward the side of the pattern center to form a directional pattern in the tread portion.

In another preferable embodiment of the invention, the steep slope segment of the main slant groove has an inclination angle of 5°–30° with respect to a plane inclusive of a circumference of the tire and the gentle slope segment of the main slant groove has an inclination angle of 65°–85° with respect to the plane. The main slant groove has an auxiliary drainage segment extending from the gentle slope segment at a relatively small angle with respect to the plane to open to the pattern end in addition to the steep slope segment and the gentle slope segment to render the arranging shape of the main slant groove into substantially S-shape. A groove width of the main slant groove is relatively large in the tread central zone and relatively small in the tread side zone, the steeply slanted auxiliary groove has an inclination angle of 3°–15° with respect to the plane inclusive of the tire circumference. The gently slanted auxiliary groove has an inclination angle of 65°–85° with respect to the plane. The steeply slanted auxiliary groove has such a shape that the width in the central zone is narrower than that of the other zone and the gently slanted auxiliary grooves are arranged from the central zone in substantially parallel to the main slant groove. At least one main circumferential groove extending substantially in parallel to the plane inclusive of the tire circumference is arranged in the tread central zone, and a fine groove extending from a top of the steep slope segment in one of the main slant grooves to open to the other main slant groove adjacent thereto is arranged. The surface height of a corner part in the land portion defined by adjoining two main slant grooves, or by the main slant groove and the main circumferential groove, or by the main slant groove and the fine groove is reduced toward a top of the corner part, and a land portion continuously extending along the circumference of the tire is formed in the tread central zone. The central land part of the land portion has a shape such that a side wall facing the steeply slanted auxiliary groove is pushed out in an arc-shaped form toward the ground contact end of the tread. Groove widths of the gentle slope segment of the main slant groove facing a side wall of the shoulder land part, the steeply slanted auxiliary groove, and the gently slant auxiliary groove are approximately equal and are within a range of 40–80% of a groove width of the steep slope segment of the main slant groove facing the side wall of the central land part. When the tire is mounted onto a vehicle so as to enter the main slant groove from the side of the pattern center toward the side of the ground contact end into a ground contacting region, the shoulder land part of the land portion is finely divided into a first ground-contacting land segment sandwiching the gently slanted auxiliary groove and a subsequent ground-contacting land segment and a surface area of the first ground-contacting land segment at the ground contact region of the tire is larger than a surface area of the subsequent ground-contacting land segment. A corner part of the subsequent ground-contacting land segment defined by the steeply slant auxiliary groove and the gentle slope segment of the main slant groove is chamfered in an arc-shaped form.

BRIEF DESCRIPTION OF THE DRAWINGS

The invention will be described with reference to the accompanying drawings, wherein:

FIG. 2 is a developed view of a tread in a second embodiment of the pneumatic tire according to the invention;

FIG. 3 is a developed view of a tread in a third embodiment of the pneumatic tire according to the invention; and FIG. 4 is a developed view of a tread in the conventional pneumatic tire.

DESCRIPTION OF THE PREFERRED EMBODIMENTS

Figure 1:
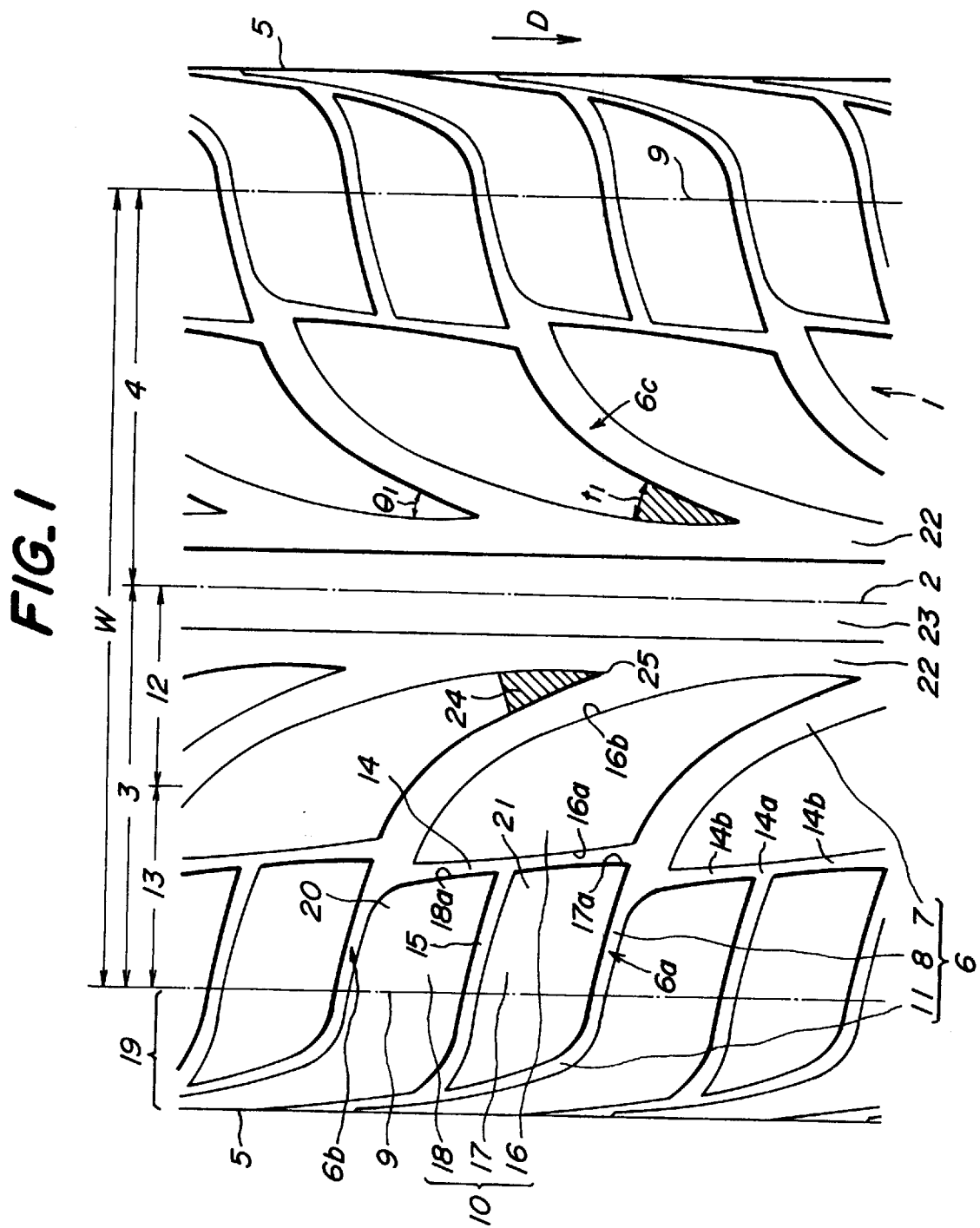
FIG. 1 is a developed view of a tread in a first embodiment of the pneumatic tire according to the invention.

In FIG. 1 is developmentally shown a part of a tread portion in a first embodiment of the pneumatic tire according to the invention, in which numeral 1 is a tread portion, numeral 2 a pattern center, numerals 3 and 4 two regions of the tread portion 1 divided by the pattern center 2, numeral 5 a pattern end, numeral 6 a main slant groove, numeral 7 a steep slope segment of the main slant groove, numeral 8 a gentle slope segment of the main slant groove, numeral 9 a ground contact end of the tread, numeral 10 a land portion, and symbol D a rotating direction of the tire.

In the illustrated tire, a plurality of the main slant grooves 6 are arranged on both regions 3 and 4 of the tread portion 1 divided by the pattern center 2 at substantially equal intervals in the circumferential direction of the tire. Each of these main slant grooves 6 is comprised of a steep slope segment 7 extending from a position of the pattern center 2 or the vicinity thereof toward the pattern end 5 at a relatively small inclination angle with respect to a plane inclusive of a circumference of the tire, preferably an angle of 5°–30° and a gentle slope segment 8 extending from the steep slope segment 7 at a relatively large inclination angle with respect to the plane, preferably an angle of 65°–85° to the pattern end 5 or to open at the ground contact end 9 of the tread. A so-called directional pattern of arranging main slant grooves 6a, 6c located at the regions 3 and 4 in a direction of converging from the side of the ground contact end 9 toward the side of the pattern center 2 is formed in the tread portion 1 and hence a plurality of land portions 10 defined by adjoining two main slant grooves 6a, 6b are formed in each of the regions 3 and 4. As seen from the rotating direction D of the tire in FIG. 1, the plurality of the main slant grooves 6 are formed in a direction of gradually enlarging from the lower side toward the upper side on the border of the pattern center at a state of mounting the tire onto the vehicle.

Although FIG. 1 shows the directional pattern that the pattern center 2 is coincident with the equator of the tire, it is not necessarily required to match the pattern center 2 with the equator of the tire and the pattern center may be somewhat shifted from the equator of the tire. Further, the main slant grooves 6 may be arranged on at least one (3 or 4) of the two regions 3 and 4 and also the directional pattern is not restricted. When the main slant grooves 6 are arranged on only one of the two regions, it is favorable that such a region is located in a position directed outward from the vehicle at a state of mounting the tire onto the vehicle.

As regards the drainage performance at wet state, observing the water flow in the ground contact region of the general tire, it has been confirmed that water flows at an angle of 5°–30° with respect to the circumferential direction of the tire in the tread central zone and flows at an angle of 65°–85° with respect to the circumferential direction in the tread side region while curving with respect to the circumferential direction to discharge sideward from the tire.

In the pneumatic tire according to the invention, the main slant groove 6 is constituted with the steep slope segment 7 and the gentle slope segment 8 to substantially match the water flow in the ground contact region of the tread as shown in FIG. 1, whereby water entered in the ground contact region can rapidly be discharged and hence the good wet performance is obtained.

Since the main slant groove 6 located at the tread side zone is comprised of the gentle slope segment 8, the formation of acute corner can be prevented in the shoulder land parts 17, 18 defined by these gentle slope segments and hence the rigidity of the land portion is enhanced and the steering stability, particularly steering stability in the cornering is improved.

In the conventional tire having a tread pattern comprised of a combination of plural main circumferential grooves and main slant grooves as shown in FIG. 4, the noise level tends to be fairly increased due to the arrangement of plural main circumferential grooves being apt to generate columnar resonance sound. In the invention, however, the main circumferential groove may be arranged if necessary, so that the noise level can be reduced as compared with the conventional tire.

In order to more balancedly improve the wet performance and steering stability, it is favorable that the main slant groove 6 is provided with an auxiliary drainage segment 11 extending from the gentle slope segment 7 at a relatively small angle, preferably an angle of 0°–30° with respect to the plane to open to the pattern end 5 in addition to the steep slope segment 7 and the gentle slope segment 8, whereby the arranging shape of the main slant groove 6 is rendered into substantially S-shape. When the region 3 or 4 is further equally divided by a phantom line parallel with the pattern center 2 into a tread central zone 12 and a tread side zone 13, the groove width of the main slant groove is relatively large, concretely within a range of 6–12 mm in the tread central zone 12 and relatively small, concretely within a range of 3–6 mm in the tread side zone 13.

Particularly, the auxiliary drainage segment 11 extending from the gentle slope segment 8 is arranged in a portion 19 of the tread not contacting with ground, whereby water slantly jetted forward from the ground contact end 9 can be discharged smoothly and the flowability of water discharged becomes good and hence the drainage performance is further improved.

In the pneumatic tire according to the invention, the tread pattern rationalizing the arrangement of the main slant grooves as mentioned above is a basic construction to ensure the wet performance and the steering stability to higher levels. Further, auxiliary grooves 14, 15 are adequately arranged in the tread side zone to rationalize the shape of the land parts located in the tread side zone, whereby the wet performance and steering stability are further improved and noise can be reduced. They are large merits in the invention.

The auxiliary groove arranged in the tread side zone 13 concretely means a steeply slant auxiliary groove 14 and a gently slant auxiliary groove 15 as shown in FIG. 1.

The steeply slant auxiliary groove 14 communicates to adjoining two main slant grooves 6a, 6b and extends in the same direction as in the main slant grooves 6a, 6b or extends in a direction of contacting a tread central zone and a tread side zone in order with ground in use and at a relatively small inclination angle, preferably an angle of 3°–15° with respect to the plane.

By arranging the steeply slant auxiliary groove 14 is helped the wiping of the tread or the deformation (contraction) produced in the pushing of arc onto plane to improve the ground contacting property.

Moreover, the reason why the arrangement of the steeply slant auxiliary groove 14 is restricted to the tread side zone 13 is due to the fact that the vicinity of a position ranging inward from the ground contact end 9 to 25% of a ground contact width W of the tread is a ground contact center based on the change of the ground contacting property through the movement of load during the cornering and is apt to create buckling and hence when the steeply slant auxiliary groove 14 is arranged in such a position, the damage of the block is apt to be caused.

And also, the steeply slant auxiliary groove 14 is arranged in the same direction as in the main slant groove 6 and at a relatively small inclination angle with respect to the plane inclusive of the tire circumference, whereby the shoulder land parts 17, 18 are rendered into substantially a parallelogram shape in which angles of kicking-out side corners 20, 21 are large to provide sufficient block rigidity to lateral force, which advantageously acts to improve the steering stability. Further, the steeply slant auxiliary groove 14 is arranged to enter into the ground contact region from the center of the tread toward the side thereof in this order, which is preferable from a viewpoint of the drainage property.

The gently slant auxiliary groove 15 is located between the adjoining two main slant grooves 6a, 6b and arranged to extend substantially in parallel to these main slant grooves 6a, 6b and at an inclination angle of 65°–85° with respect to the plane from the steeply slant auxiliary groove 14 to the pattern end 5 or to open at the ground contact end 9 of the tread.

When the land portions 10 are formed by the above arrangement of the main slant grooves 6, the shoulder land portion tends to have a ground contact area larger than that of the central land part 16. In this case, it tends to create heel and toe wear due to the dragging based on the difference of radius in the widthwise direction of the tread and the movement of blocks through lateral force. In the invention, however, the shoulder land portion is divided into several land parts 17, 18 by arranging the gently slant auxiliary groove in the shoulder land portion, whereby the occurrence of heel and toe wear is controlled and the drainage performance at wet state can be supplemented.

Moreover, the number of the gently slant auxiliary grooves 15 is not particularly restricted, but it is favorable that the land portion 10 is divided into two shoulder land parts 17, 18 by arranging one gently slant auxiliary groove 15 every the land portion 10 as shown in FIG. 1. Also, the arranging pitch of the gently slant auxiliary groove 15 is favorable to be 50°–70° pitches on the circumference from a viewpoint of a balance between block rigidity and pattern noise.

Further, when a side wall 16a of the central land part 16 facing the steeply slant auxiliary groove 14 is rendered into an arc shape pushing toward the ground contact end 9 of the tread, the rigidity of the central land part 16 can effectively be enhanced.

In this case, the arc-shaped portion is favorable to have substantially a radius of curvature of 200–600 mm. When it is less than 200 mm, the difference in the width of the steeply slant auxiliary groove 14 is too large and becomes disadvantageous in the drainage property. When it exceeds 600 mm, the side wall is substantially straight and the effect is lost.

In addition, if it is required to effectively enhance the rigidities of the shoulder land parts 17, 18, side walls 17a, 18a of the shoulder land parts 17, 18 facing the steeply slant auxiliary groove 14 may be rendered into an arc shape pushing toward the pattern center 2. In this case, the radius of curvature of the arc-shaped portion is favorable to be the same as in the side wall 16a.

When the side wall 16a of the central land part 16 and the side walls 17a, 18a of the shoulder land parts 17, 18 are have the arc-shaped portions, the width of a central portion 14a of the steeply slant auxiliary groove 14 becomes narrower than the width of the other portions 14b. In this case, the deterioration of the drainage property is prevented by arranging the gently slant auxiliary groove 15 in a position corresponding to the central portion 14a.

The groove width of the gentle slope segment 8 of the main slant groove 6 facing the side wall of the shoulder land part and the groove width of the gently slant auxiliary groove 15 are favorable to be set to 40–80% of the groove width of the steep slope segment 7 of the main slant groove 6 facing the side wall 16b of the central land part 16. When it is less than 40%, the drainage property is undesirably degraded, while when it exceeds 80%, a sound impact component becomes large and there is a tendency of increasing the pattern noise.

Also, the groove width of the steeply slant auxiliary groove 14 is favorable to be set to 40–80% likewise the above groove width of the gently slant auxiliary groove 15.

When it is less than 40%, the drainage property is degraded. When it exceeds 80%, the falling down of the shoulder land parts during the cornering becomes conspicuous and damage is apt to be caused to lower the steering stability.

When the tire is mounted onto the vehicle so that the main slant groove 6 is entered into the ground contact region from the side of the pattern center 2 toward the side of the ground contact end 9 of the tread in order, the shoulder land part of the land portion 10 is finely divided into a first ground-contacting land segment 17 sandwiching the gently slant auxiliary groove 15 and a subsequent ground-contacting land segment 18. Thus when a corner part 20 of the subsequent ground-contacting land segment 18 defined by the steeply slant auxiliary groove 14 and the gentle slope segment 8 of the main slant groove is chamfered in an arc-shaped form, the flowing of water from the tread central zone 12 toward the tread side zone 13 can be smoothened and the drainage performance is improved.

Since the wet performance is particularly considered in FIG. 1, at least one main circumferential groove 22 (two grooves in FIG. 1) extending substantially in parallel to the plane inclusive of the tire circumference is arranged in the tread central zone 12. In this case, however, the arrangement of the main circumferential groove 22 may increase the noise level due to the occurrence of columnar resonance sound, so that the tread pattern basically consisting of the main slant grooves and including no main circumferential groove as shown in FIG. 2 is favorable from a viewpoint of noise reduction. Therefore, a desirable tread pattern may properly be selected in accordance with the use purpose.

If it is required to further increase the rigidity of land portion at the tread central zone 12 in the tread pattern provided with the main slant grooves 6 for particularly considering the steering stability, a rib-shaped land portion 23 continuously extending along the circumference of the tire is arranged in the tread central zone 12 to enhance the rigidity of the land portion located in the tread central zone, whereby the stably straight running performance and the steering performance can be increased. Further, the rib-shaped land portion 23 has a function of effectively reducing the pattern noise as compared with the case having no rib-shaped land portion.

In order to enhance the ground contacting property without arranging the main circumferential groove, it is favorable to arrange a fine groove 26 extending from a top of a steeply slope segment of a main slant groove to an opening of an adjoining main slant groove as shown in FIG. 3.

Furthermore, a corner part 24 of the land portion 10 defined between the adjoining two main slant grooves, between the main slant groove and the fine groove 26 (FIG. 3), or between the main slant groove 6 and the main circumferential groove 22 (FIG. 1) (only a part of the corner parts is shown by a shadowed region in FIGS. 1 and 3 for convenience' sake) forms an acute angle, so that the crushing or escape deformation into the groove is apt to be caused during ground contacting. In this case, the surface height of the corner part 24 is reduced toward a top 25 thereof to enhance the rigidity of the corner part 24, whereby the crushing in the ground contacting at the corner part 24 and hence the escape deformation into the groove is prevented to sufficiently smoothen the drainage and. Also the ground contact pressure of the corner part 24 may be enhanced for effectively contributing to the steering stability and the resistance to uneven wear.

In the latter case, it is favorable that the reducing region of the surface height is within a range of 20–40 mm from the top 25 of the corner part 24 in the longitudinal direction thereof.

When the reducing region is less than 20 mm, a low-rigidity land portion still remains. When it exceeds 40 mm, the ground contact area of the block is too small to lower the rigidity of the land portion and it is obliged to degrade the steering stability.

Moreover, the height reduction may be carried out, for example, by shaping the land surface of the corner part 24 into a convex curve outward in the radial direction or into a slantly flat surface.

Although only an embodiment of the invention has been described above, various modifications may be carried out within a spirit of the invention.

A pneumatic tire according to the invention is prepared and then tests for evaluating drainage performance at wet state and steering stability and noise reduction on dry road surface are made with respect to the resulting tire as mentioned below.

⊚ Test tire

It is a tire having a size of 225/50R16 and a ground contacting width of tread (W) of 200 mm.

• Invention tire 1

It is a tire having a tread pattern shown in FIG. 1 and dimensions shown in Table 1.

TABLE 1

| | Groove width (mm) | Groove angle arranged with respect to tire circumference (°) | Groove depth (mm) |
|---|---|---|---|
| Portion of main slant groove A *1 | 8 ~ 10 | 10 ~ 60 | 8.0 |
| Portion of main slant groove B *2 | 4 | 70 ~ 80 | 6.5 |
| Portion of main slant groove C *3 | 4 ~ 2 | 70 ~ 10 | 6.5 ~ 1 |
| Steeply slant auxiliary groove 14 | 3 ~ 5 | 5 ~ 10 | 6.5 |
| Gently slant auxiliary groove 15 | 4 | 70 ~ 80 | 6.5 |
| Main circumferential groove 22 | 9 | 0 | 8.0 |

Width (mm) of center rib 2: 20, Radius of curvature R of side wall 16a: 500, Radii of curvature R of side walls 17a and 18a: 300, Radius of curvature R of corner part 20: 12, Top angle ($\theta_1$) of corner part 24: 25°, Maximum width of corner part 24: 10 mm
*1: Portion A of main slant groove means steep slope segment 7 of main slant groove and a portion of gentle slope segment 8 ranging from the steep slope segment 7 to opening position of steeply slant auxiliary groove 14.
*2: Portion B of main slant groove indicates a portion other than gentle slope segment 8 included in the portion A and an auxiliary drainage portion.
*3: Portion C of main slant groove indicates an auxiliary drainage portion 11.

Invention tire 2

It is a tire having a tread pattern shown in FIG. 2 and dimensions shown in Table 2.

TABLE 2

| | Groove width (mm) | Groove angle arranged with respect to tire circumference (°) | Groove depth (mm) |
|---|---|---|---|
| Portion of main slant groove A *1 | 5 ~ 11 | 20 ~ 60 | 8.0 |
| Portion of main slant groove B *2 | 4 | 70 ~ 80 | 6.5 |
| Portion of main slant groove C *3 | 4 ~ 2 | 70 ~ 10 | 6.5 ~ 1 |

TABLE 2-continued

|  | Groove width (mm) | Groove angle arranged with respect to tire circumference (°) | Groove depth (mm) |
|---|---|---|---|
| Steeply slant auxiliary groove 14 | 3 ~ 5 | 5 ~ 10 | 6.5 |
| Gently slant auxiliary groove 15 | 4 | 70 ~ 80 | 6.5 |

Radius of curvature R of side wall 16a: 250, Radii of curvature R of side walls 17a and 18a: 250, Radius of curvature R of corner part 20: 10
*1: Portion A of main slant groove means steep slope segment 7 of main slant groove and a portion of gentle slope segment 8 ranging from the steep slope segment 7 to opening position of steeply slant auxiliary groove 14.
*2: Portion B of main slant groove indicates a portion other than gentle slope segment 8 included in the portion A and an auxiliary drainage portion.
*3: Portion C of main slant groove indicates an auxiliary drainage portion 11.

• Invention tire 3

It is a tire having a tread pattern shown in FIG. 3 and dimensions shown in Table 3.

TABLE 3

|  | Groove width (mm) | Groove angle arranged with respect to tire circumference (°) | Groove depth (mm) |
|---|---|---|---|
| Portion of main slant groove A *1 | 5 ~ 11 | 20 ~ 60 | 8.0 |
| Portion of main slant groove B *2 | 4 | 70 ~ 80 | 6.5 |
| Portion of main slant groove C *3 | 4 ~ 2 | 70 ~ 10 | 6.5 ~ 1 |
| Steeply slant auxiliary groove 14 | 3 ~ 5 | 5 ~ 10 | 6.5 |
| Gently slant auxiliary groove 15 | 4 | 70 ~ 80 | 6.5 |
| Fine groove 26 | 2 ~ 3 | 50 | 6.5 |

Radius of curvature R of side wall 16a: 250, Radii of curvature R of side walls 17a and 18a: 250, Radius of curvature R of corner part 20: 10, Top angle ($\theta_1$) of corner part 24: 25°, Maximum width of corner part 24: 8 mm
*1: Portion A of main slant groove means steep slope segment 7 of main slant groove and a portion of gentle slope segment 8 ranging from the steep slope segment 7 to opening position of steeply slant auxiliary groove 14.
*2: Portion B of main slant groove indicates a portion other than gentle slope segment 8 included in the portion A and an auxiliary drainage portion.
*3: Portion C of main slant groove indicates an auxiliary drainage portion 11.

• Conventional tire

It is a tire having a tread pattern shown in FIG. 4 and dimensions shown in Table 4.

TABLE 4

|  | Width (mm) | Angle (°) | Groove depth (mm) |
|---|---|---|---|
| Main circumferential groove 31 | 11 | 0 | 8.0 |
| Main circumferential groove 32 | 10 | 65 | 8.0 |
| Main circumferential groove 33 | 4 | 50 | 8.0 |
| Lateral groove 34 | 5 | 80 | 6.5 |
| Lateral groove 35 | 4.5 ~ 5.0 | 50 ~ 70 | 6.5 |
| Lateral groove 36 | 5 | 75 | 6.5 |

⊙ Test Methods

The drainage performance at wet state in the straight running and cornering is evaluated when the tire is run at an internal pressure of 2.3 kgf/cm² under a load corresponding to two passengers.

The drainage performance at wet state in the straight running is evaluated by measuring a limit speed of generating hydroplaning when the tire is run on wet road surface having a water depth of 5 mm.

The drainage performance at wet state in the cornering is evaluated by measuring a limit lateral gravity when the tire is run on wet road surface having a water depth of 5 mm and a radius of 80 m.

The steering stability on dry road surface is evaluated by a professional driver's feeling when the tire is run on a circuit course at dry state in various sporty running modes.

Noise is evaluated by measuring a noise level inside a compartment when the vehicle is run by inertia from 100 km/h on a straight smooth road surface.

⊙ Test results

The test results are shown in Table 5 by an index on the basis that the conventional tire is 100.

The larger the index value, the better the property.

TABLE 5

|  | Drainage performance at wet state (straight running) | Drainage performance at wet state (cornering) | Steering stability on dry road surface | Noise |
|---|---|---|---|---|
| Conventional tire | 100 | 100 | 100 | 100 |
| Invention tire 1 | 120 | 120 | 120 | 110 |
| Invention tire 2 | 110 | 110 | 125 | 120 |
| Invention tire 3 | 115 | 115 | 120 | 115 |

As seen from the results of Table 5, the invention tires 1–3 are superior to the conventional tire in the wet performance, steering stability and noise level.

According to the invention, it is possible to provide pneumatic tires, particularly high-performance tire having excellent drainage performance at wet state and steering stability and less noise level.

What is claimed is:

1. A pneumatic tire comprising; a tread portion divided into two regions at a center of a tread pattern, and a plurality of main slant grooves arranged in at least one of the two regions at substantially equal intervals in a circumferential direction of the tire, each of the main slant grooves being comprised of a steep slope segment extending from a position of the pattern center or the vicinity thereof toward a side of an end of the tread pattern at a relatively small inclination angle with respect to a plane inclusive of the circumference of the tire and a gentle slope segment extending from the steep slope segment at a relatively large inclination angle with respect to the plane to the end of the tread pattern or to open at a ground contact end of the tread, and a plurality of land portions defined by adjoining two main slant grooves in said at least one of the two regions, a single steeply slant auxiliary groove communicating to the adjoining two main slant grooves and extending at a relatively small inclination angle with respect to the plane in the same direction as in the main slant groove and a gently slant auxiliary groove disposed between the adjoining two main slant grooves and extending from the steeply slant auxiliary groove to the end of the tread pattern or to open at the ground contact end of the tread substantially in parallel to the main slant groove being arranged in a tread side zone wherein, said at least one of the two regions is equally divided by a phantom line parallel with the pattern center into a tread central zone and the tread side zone, a land portion is further divided by the arrangement of these auxiliary grooves into a central land part and several shoulder land parts, said central land part of the land portion has a shape such that a side wall facing the steeply slant auxiliary groove is pushed out in an arc-shaped form toward the ground contact end of the tread, and groove widths of the gentle slope segment of the main slant groove facing a side wall of the shoulder land part, the steeply slant auxiliary groove and the gently slant auxiliary groove are approximately equal and are within a range of 40–80% of a groove width of the steep slope segment of the main slant groove facing the side wall of the central land part.

2. A pneumatic tire according to claim 1, wherein the grove arrangement formed in said at least one of the two regions of the tread is applied to the other remaining region and the main slant grooves located at both the two regions are arranged in a direction converging from the side of the ground contact end of the tread toward the side of the pattern center to form a directional pattern in the tread portion.

3. A pneumatic tire according to claim 1, wherein the steep slope segment of the main slant groove has an inclination angle of 5°–30° with respect to a plane inclusive of a circumference of the tire and the gentle slope segment of the main slant groove has an inclination angle of 65°–85° with respect to the plane.

4. A pneumatic tire according to claim 1, wherein the main slant groove has an auxiliary drainage segment extending from the gentle slope segment at a relatively small angle with respect to the plane to open to the pattern end in addition to the steep slope segment and the gentle slope segment to provide the main slant groove with substantially S-shape and a groove width of the main slant groove is relatively large in the tread central zone and relatively small in the tread side zone.

5. A pneumatic tire according to claim 1, wherein the steeply slant auxiliary groove has an inclination angle of 3°–15° with respect to the plane inclusive of the tire circumference.

6. A pneumatic tire according to claim 1, wherein the gently slant auxiliary groove has an inclination angle of 65°–85° with respect to the plane.

7. A pneumatic tire according to claim 1, wherein the steeply slant auxiliary groove has such a shape that a groove width in a central zone of said steeply slant auxiliary groove is narrower than that of other portions thereof and the gently slant auxiliary grooves are arranged from the central zone in substantially parallel to the main slant groove.

8. A pneumatic tire according to claim 1, wherein at least one main circumferential groove extending substantially in parallel to the plane inclusive of the tire circumference is arranged in the tread central zone.

9. A pneumatic tire according to claim 1, wherein a fine groove extending from a top of the steep slope segment in one of the main slant grooves to open to the other main slant groove adjacent thereto is arranged.

10. A pneumatic tire according to claim 8, wherein a surface height of a corner part in the land portion defined by adjoining two main slant grooves, or by the main slant groove and the main circumferential groove, or by the main slant groove and a fine groove is reduced toward an apex of the corner part.

11. A pneumatic tire according to claim 1, wherein a land portion continuously extending along the circumference of the tire is formed in the tread central zone.

12. A pneumatic tire according to claim 1, wherein the gently slant auxiliary groove is sandwiched between a first ground-contacting land segment and a subsequent ground-contacting land segment and a surface area of the first ground-contacting land segment at the ground contact region of the tire is larger than a surface area of the subsequent ground-contacting land segment and a corner part of the subsequent ground-contacting land segment defined by the steeply slant auxiliary groove and the gentle slope segment of the main slant groove is chamfered in an arc-shaped form.

* * * * *